United States Patent Office 3,147,094
Patented Sept. 1, 1964

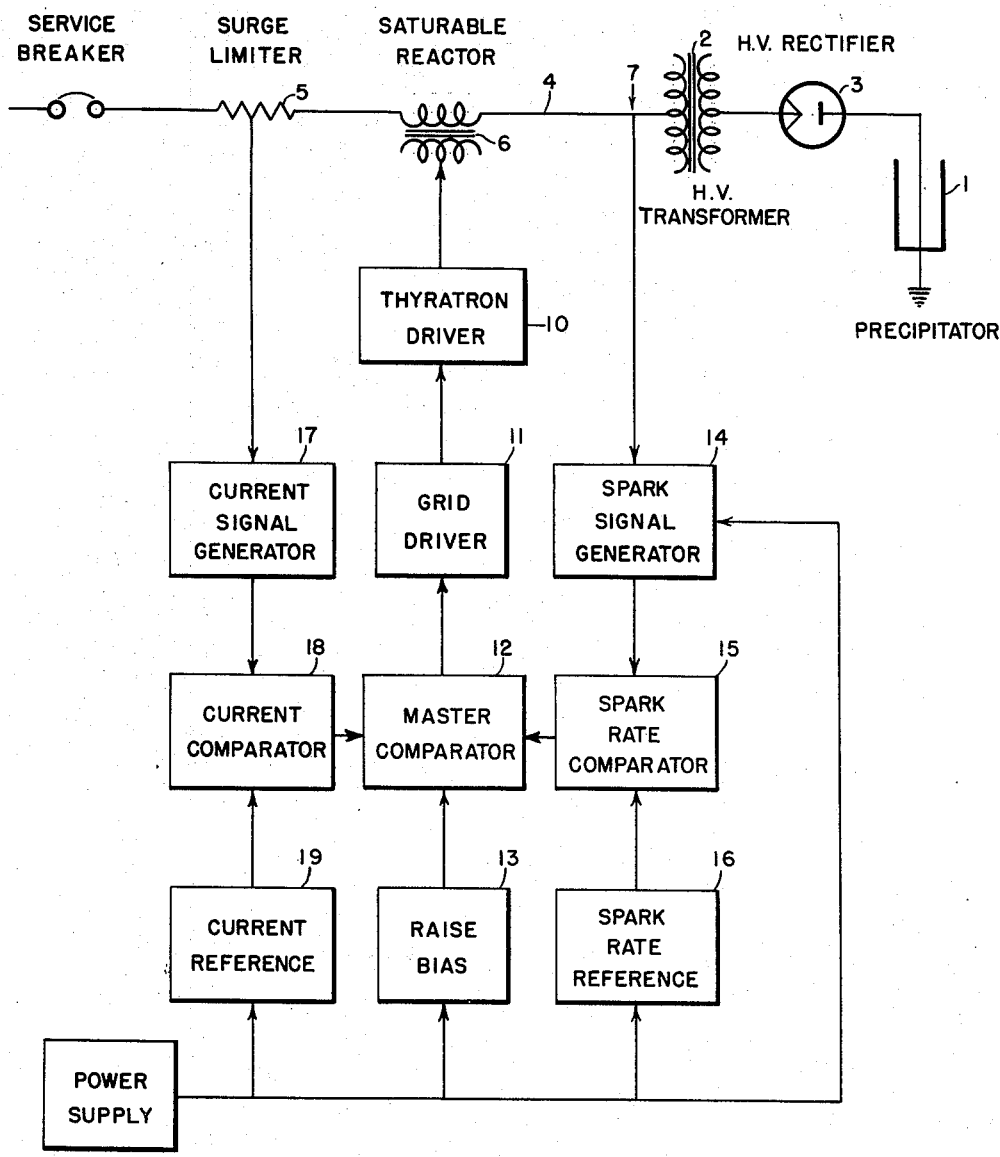

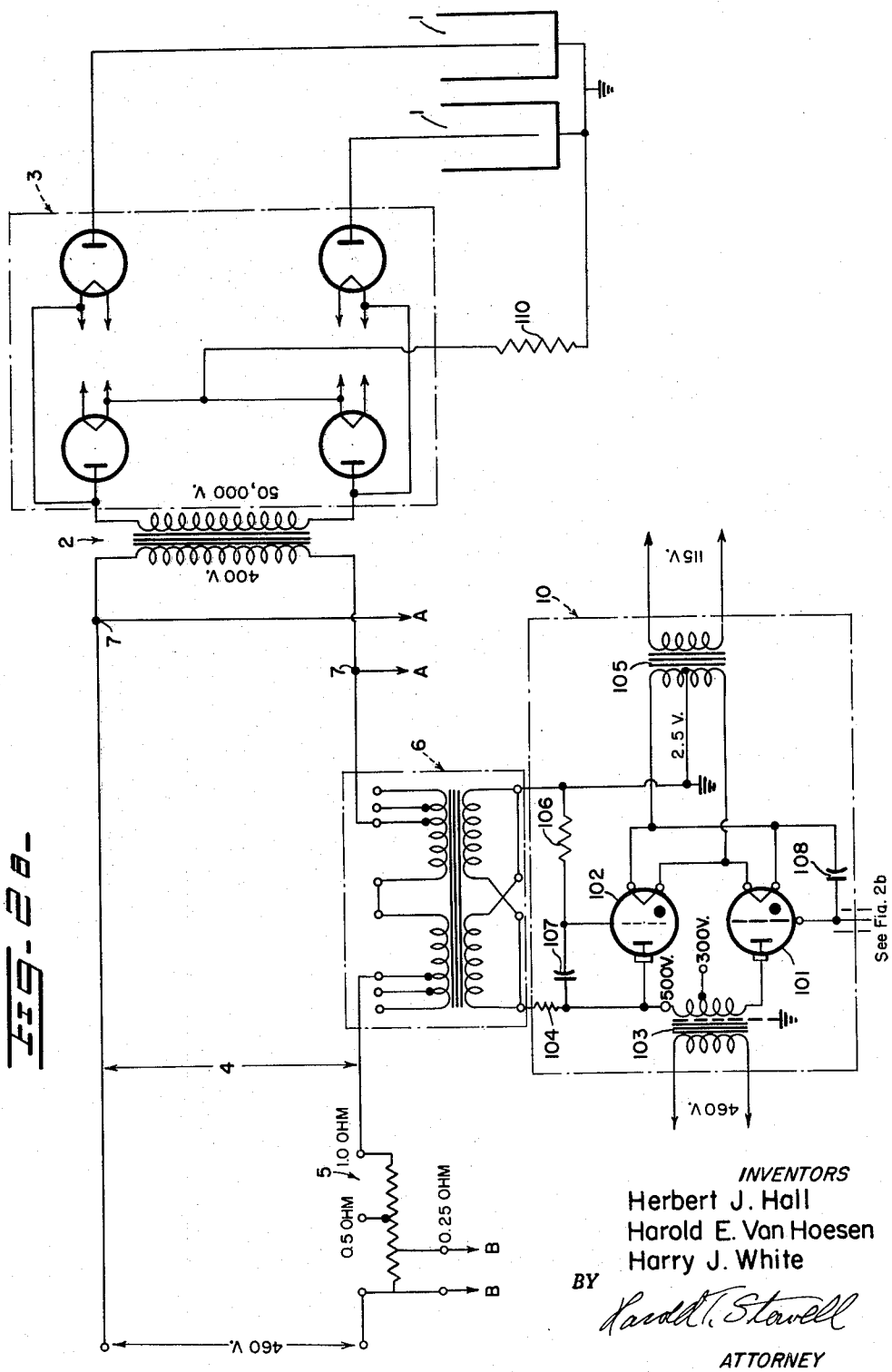

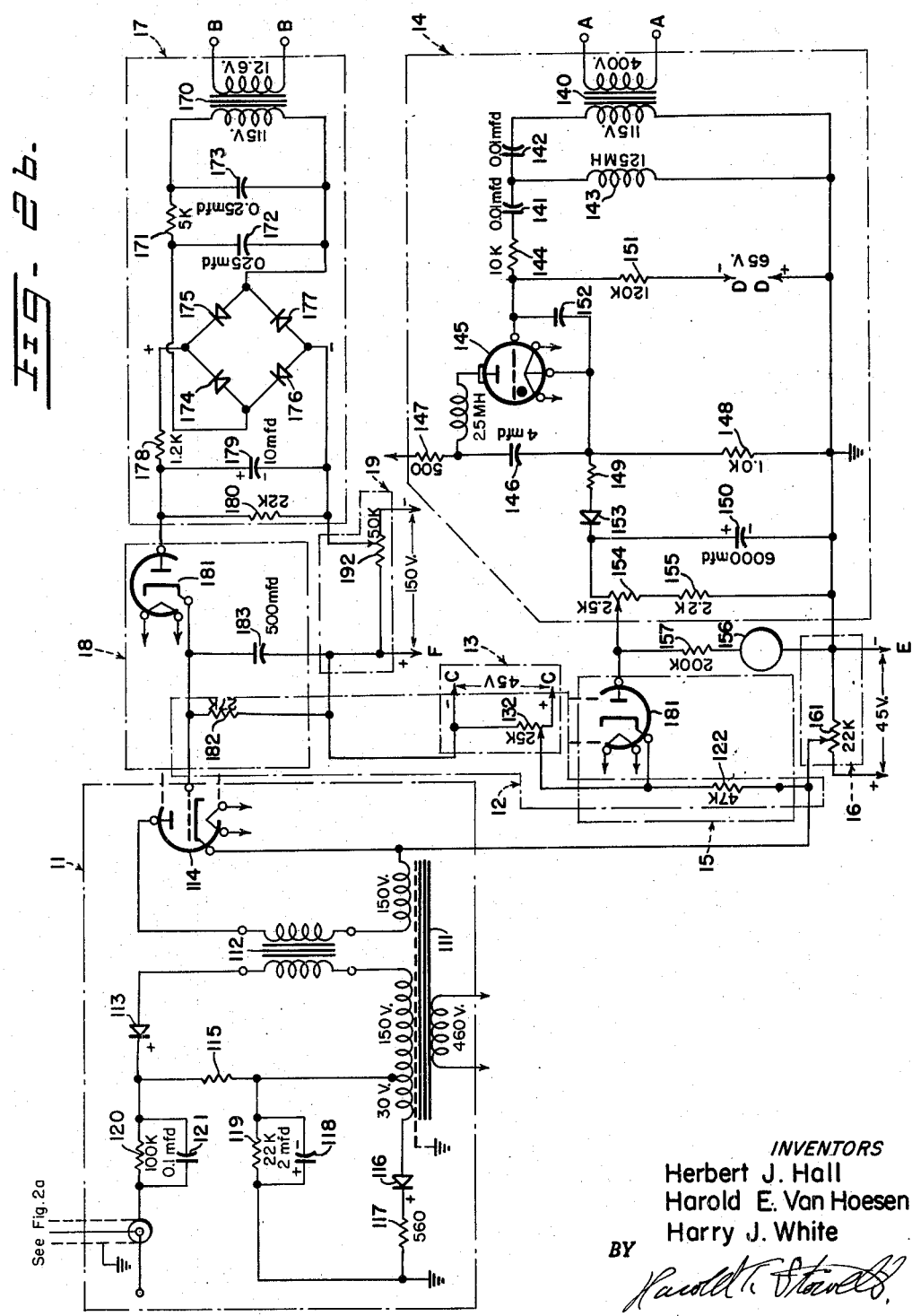

3,147,094
CONTROL SYSTEM FOR ELECTRICAL
PRECIPITATORS
Herbert J. Hall, Princeton, Harold E. Van Hoesen, Somerville, and Harry J. White, Basking Ridge, N.J., assignors to Research-Cottrell, Inc., Bridgewater Township, Somerset County, N.J., a corporation of New Jersey
Filed Dec. 3, 1956, Ser. No. 625,803
20 Claims. (Cl. 55—105)

This invention relates to an automatic control system for electrical precipitators and to component control circuits of such automatic control systems.

An object of the invention is to provide a fully automatic, completely electronic control system for the energization of electrical precipitators which will maintain the maximum rated voltage across the complementary electrodes of an electric precipitator consistent with optimum sparking rates between the electrodes.

A further object is to provide in such a control system means for automatically controlling the input current to prevent overloading of the rectifier set.

Another object is to provide a fully automatic electrical precipitator energization control which will continuously energize a precipitator at the maximum rated voltage modified as required to maintain interelectrode sparking, where present, at a predetermined rate and to control input current and/or voltage within predetermined limits.

These and other objects and advantages, which will be apparent from the more detailed description of the invention below, are provided by an automatic control system for electrical precipitators supplied with high voltage direct current by a high voltage transformer-rectifier set, the control system comprising a saturable reactor in the power supply line to the high voltage transformer, means supplying a direct current to the control winding of the saturable reactor to increase the voltage supplied to the high voltage transformer, and means responsive to a plurality of electrical parameters of the transformer rectifier set, such as rate of precipitator interelectrode sparking, current supply to the high voltage transformer, and voltage supply to the high voltage transformer, for reducing the direct current supplied to the control winding of the saturable reactor when any of said electrical parameters exceeds a predetermined value. An illustrative control system more particularly described hereinafter includes means for sensing the occurrence of sparking in the precipitator, means actuated by the spark sensing means for generating a signal varying with the rate of sparking, means for reducing said direct current supply in response to the sparking rate signal when said signal exceeds a predetermined value, means for sensing the current supplied to the high voltage transformer, means actuated by the current sensing means for generating a signal varying with the current supply to the high voltage precipitator, and means for reducing said direct current supply in response to the current signal when said signal exceeds a predetermined value.

The invention will be described in more detail with particular reference to the accompanying drawings in which:

FIG. 1 is a functional block diagram of an electrical precipitator control system embodying the principles of the invention; and FIGS. 2a and 2b, taken together, show a circuit diagram of an illustrative control system of the invention as diagrammatically outlined in FIG. 1.

In FIG. 1, 1 is an electrical precipitator energized with high tension direct current from high voltage transformer 2 and rectifier 3. The high voltage rectifier 3 may comprise rectifier tubes or semi-conductor rectifiers such as selenium or silicon rectifiers. In A.C. supply line 4 to the transformer are included a surge limiting device 5 and a saturable reactor 6.

The static power control element of the system is the saturable reactor 6 inserted in the power supply to high voltage transformer 2. Input to the transformer 2 and rectifier 3 is controlled within wide limits, by varying D.C. current flow in the reactor control winding. The thyratron driver 10 and grid driver 11 function as a D.C. power amplifier which provides the variable D.C. currents to control the reactor. The grid driver 11 functions as a phase shifter in accordance with the D.C. signal voltage applied to its input. Output from the grid driver is a phase-shifted trigger which will cause the thyratron driver output current to vary in accordance with the trigger phase angle.

To provide the automatic voltage raise function, a fixed D.C. signal voltage is supplied by the raise bias 13 to the grid driver through the master comparator 12. In the absence of other signals this bias causes D.C. current to flow through the reactor control winding. Reactor impedance will decrease, and the high voltage rectifier input will increase towards rated voltage. The magnitude of the raise bias signal is preset so that the input voltage will not rise beyond the high voltage rectifier rating.

Automatic sparking rate control is achieved through the following servo control loop. Precipitator sparking is sensed in the primary circuit of the high voltage transformer as indicated at 7. The spark signal generator 14 senses the sparking and provides a low level D.C. signal voltage which is proportional to the sparking rate. The spark rate reference 16 is a preset standard voltage equivalent to the desired sparking rate signal voltage. The variable sparking rate signal and the fixed reference signal are supplied to the spark rate comparator 15. This element detects the difference between these signals. An error output signal is obtained from the comparator whenever precipitator sparking rate exceeds the preset reference. This error signal is proportional to the difference between the input signals. To maintain the present sparking rate, the spark rate error signal is used to continuously modify the upward drive provided by the raise bias. This modification is accomplished in the master comparator 12. Output from the master comparator is then applied to the grid driver which in turn controls input to the high voltage transformer through the thyratron driver and saturable reactor previously described. This closes the servo control loop. Due to the feed back operation, a dynamic equilibrium is rapidly obtained where the spark rate reference and spark signals are in balance. Under this condition precipitator sparking rate is maintained close to the value set by the spark rate reference.

Automatic current limiting action is achieved through a similar servo control loop. Primary current is sensed by a tap on the surge limiting resistor 5. The current signal generator 17 converts the A.C. input current to a low level D.C. voltage which is proportional to the average A.C. current. A separate current reference 19 is used to preset the maximum operating current. The output from the the current signal generator is compared with the current reference by the current comparator 18. Like the spark rate comparator this comparator provides an error output signal proportional to the difference between the two input signals. Whenever the current signal exceeds the current reference, an error signal is obtained from the current comparator. This error signal is also applied in the master comparator in opposition to the raise bias. The current error signal continuously modifies the upward drive of the raise bias to lower the transformer input through the grid driver, thyratron driver, and saturable reactor. This completes the current servo loop. Dynamic control equilibrium occurs when the current signal and the current reference voltage are equal.

Automatic selection of the predominant control factor is obtained in the master comparator 12. This element functions as a mixer for the three input signals from the raise bias 13, the spark rate comparator 15, and the current comparator 18. Output from the master comparator is equal to the sum of the three input signals. To obtain proper control operation, the raise bias is polarized to raise the high voltage transformer input. The error signals from the spark rate, and current comparators are polarized to reduce input to the high voltage transformer. Interaction between the spark rate comparator, current comparator, and raise bias is prevented by the circuit employed in the master comparator.

In FIGS. 2a and 2b components of the control and energizing system are marked with the same reference numerals as the corresponding components of FIG. 1. Illustrative parameters of the various circuit elements are given in connection with the following detailed description of their functioning in the operation of the system shown by way of example in the drawings.

Resistor 5 in the primary circuit to the transformer 2 serves two purposes. It acts as a current shunt from which the current control signal is derived in current signal generator 17, and it limits inrush current to the transformer when the primary contactor is closed. Limitation of inrush current may also be obtained by the use of circuit inductance if desired and the current signal can be obtained by means of a current transformer instead of the resistor.

Saturable reactor 6 functions as a variable series impedance which can be changed by varying the D.C. current flow in its control winding. The control windings may be shielded to minimize the effect of A.C. circuit transients on the D.C. control circuit. Taps are provided on the A.C. windings to obtain different control regions.

Thyratron driver 10 includes a half-wave grid controlled rectifier 101 which provides the variable D.C. current to control saturable reactor 6. The components in this circuit perform the following functions:

Thyratron 102 maintains the current flow due to inductance in control winding of 6. Plate transformer 103 supplies power for D.C. output. Forcing resistor 104 shields rectifier 102 from A.C. transient surges passed through the saturable reactor and speeds response of the reactor to D.C. control changes. Transformer 105 supplies filament power for tubes 101 and 102. Resistor 106 and capacitor 107 act as a phase shifter to decrease firing voltage of thyratron 102. Capacitor 108 acts as a noise filter to prevent firing of thyratron 101 due to transients in the plate supply voltage.

The output of the thyratron driver is varied by applying a phase shifted trigger pulse to the grid of 101. When the plate of 101 swings positive each half cycle, the tube may be fired by positive trigger applied to the grid. If this trigger appears early in the cycle, full output is obtained. The output may be gradually reduced by applying the trigger pulse later and later in the cycle until a point is reached at 180° phase shift when the thyratron does not fire at all. This corresponds to zero output. After tube 101 has fired, current flow due to inductance of the control winding is permitted to flow through back rectifier 102. This is necessary to provide smooth control, and prevent high inverse voltage on tube 101.

The grid driver 11 controls the thyratron driver output through the grid of 101. This element serves two purposes; it provides the phase shifted trigger pulse to fire 101, and it provides suitable negative bias to prevent unwanted firing of 101.

The following components provide the phase shifted trigger pulse:

Transformer 111 supplies isolated A.C. voltages for operation of the grid driver. Saturable-core transformer 112 provides a non-linear magnetic element for generation of the phase-shifted trigger pulse. Diode 113 polarizes current flow in the output winding of 112. Tube 114 polarizes and controls current flow in the input winding of 112. Resistor 115 is a load impedance for transformer 112 and grid return resistor for tube 101.

Operation of the grid phasing circuit depends upon flux setting in the core of transformer 112. If tube 114 offers low impedance, the core flux is fully reset and no output pulse appears across resistance 115. If tube 114 offers high impedance, the core of transformer 112 is not fully reset and a voltage pulse appears across 115. The time (or phase shift) at which this pulse appears is dependent entirely upon the value of the reset current pulse through tube 114. Phase shifts of approximately 0 to 170° are obtainable. Thus by varying the impedance of 114 it is possible to obtain a variable phase shifted trigger pulse across 115. This trigger controls the firing of thyratron 101 which produces the D.C. current to control saturable reactor 6.

Negative grid bias for thyratron 101 is obtained in the following manner: One secondary winding of 111 is tapped at approximately 30 v. for the fixed-bias supply. This A.C. voltage is rectified by diode 116 and filtered by resistance 117 and capacity 118 to provide negative bias voltage. Resistor 119 is a bleeder resistor for 118. As a safety measure, self-bias is also employed. Resistor 120 and capacitor 121 are used to provide grid-leak bias. These bias voltages prevent unwanted firing of tube 101.

The automatic voltage raise function is accomplished through the raise bias 13. The raise bias is a preset D.C. voltage which is applied to the grid of tube 114 in the proper polarity to increase the D.C. output of the thyratron driver. This reduces the impedance of the saturable reactor 6 and causes primary voltage of the high voltage transformer 2 to rise to the rated value. The raise bias is obtained through a potentiometer arrangement consisting of resistor 132 connected across a stabilized D.C. voltage applied to terminals "C." This current is polarized so that the grid of tube 114 is driven negative by the raise bias.

The spark signal generator 14 senses precipitator sparking and provides a low level D.C. voltage proportional to the sparking rate. It consists of two component circuits:

The spark-sensing circuit detects precipitator sparking and converts it to a pulse to fire the electronic integrator. This circuit consists of transformer 140, capacities 141 and 142 and inductance 143. Transformer 140 is connected to the primary of the high voltage transformer at taps "A" to transmit the sparking transients. Also it isolates the spark signal generator from the power supply. Components 141, 142 and 143 form a high-pass filter network. This network is tuned to pass the spark frequencies and reject the 60-cycle voltages appearing on the secondary of transformer 140.

The spark integrator circuit converts the spark pulses to a low level D.C. voltage proportional to the average sparking rate. Spark pulses from the filter are transmitted through grid resistor 144 to the grid of tube 145 to fire it. When 145 is fired by a spark pulse, it discharges capacitor 146. Capacitor 146 then recharges through resistors 147 and 148 from the D.C. power supply. The recharging pulse voltage developed across 148 is integrated by resistor 149 and capacitor 150. The more rapidly tube 145 is fired, the higher the average voltage will be across capacitor 150. By proper choice of components the voltage across 150 will be directly proportional to the average sparking rate. Tube 145 is prevented from firing by a negative grid bias applied to resistor 151. This bias is supplied from the D.C. power supply which is connected to terminals "D." Resistor 144 couples the grid circuit to the high-pass filter circuit. Capacitor 152 is a noise filter to prevent the firing of tube 145 due to transients in the plate supply voltage. Diode 153 increases the voltage appearing across 150 by preventing 150 from discharging back into the spark pulser circuit. Resistors 154 anad 155 are the load resistors for the spark integrator. The integrator output voltage appears across 154 and 155. Resistor 154 includes a calibration adjustment to compensate for tolerances in the integrator components. The spark signal generator output is indicated on meter 156, calibrated in sparks per minute. Resistor 157 is a series calibrated resistor for 156.

The spark rate reference 16 is the control standard for the sparking rate control system. It is a steady D.C. voltage which can be preset to a value equal to the spark signal generator output at the desired sparking level. This is accomplished by applying a stabilized D.C. voltage to the potentiometer arrangement consisting of resistor 161. The spark rate reference voltage appears between point "E" and the arm of the potentiometer 161.

Comparison of the spark signal generator output and the spark rate reference is accomplished in spark signal comparator 15. Vacuum tube 181 and resistor 122 comprise the comparator circuit. When the output of the spark signal generator is greater than the spark rate reference voltage, an error signal will appear across 122. This is due to the fact that a first diode unit within tube 181 will pass current when its plate is driven positive with respect to the cathode. The polarity of the error voltage appearing across 122 is such that it opposes the raise bias voltage. This reduces the negative grid voltage on tube 114, and causes the thyratron driver output to decrease—resulting in reduced voltage applied to the high voltage transformer. This is accomplished through the series connection of the raise bias and resistor 122 in the grid circuit of tube 114.

In summary, the automatic sparking rate control operates as follows: Precipitator voltage is increased by the raise bias. Precipitator sparking is sensed and converted to a sparking rate by the spark signal generator. This rate is then compared with the spark rate reference. When precipitator sparking exceeds the desired level, the spark comparator provides an error signal which is opposed to the raise bias. This decreases precipitator voltage by decreasing the output of the thyratron driver.

The current signal generator 17 monitors precipitator current and automatically controls this current to prevent overloading of the rectifier. Primary current in the high voltage transformer is sensed across the surge limiting resistor 5 at taps "B." The voltage appearing across "B" is proportional to the average current flowing in the circuit. This voltage is applied to transformer 170 which isolates the current signal generator from the power circuit, and steps up this voltage to a higher value. Transformer 170 feeds a low-pass filter network which will pass the 60-cycle frequency and reject sparking transients. The low-pass filter consists of resistor 171 and capacitors 172 and 173. The A.C. voltage is then rectified by small bridge-rectifier consisting of diodes 174, 175, 176 and 177. Output from this rectifier is a D.C. voltage proportional to the average current flowing in the primary circuit. Resistor 178 and capacitor 179 form a filter network. The purpose of this network is to remove the 60-cycle ripple appearing across the rectifier D.C. output. Resistor 180 is a load resistor for the current signal generator. The D.C. voltage appearing across resistor 180 is proportional to the average value of the current flowing in the primary circuit.

The current reference 19 provides a preset standard equivalent to the desired maximum operating current in the primary circuit. Like the spark rate reference, it is simply a potentiometer arrangement consisting of resistor 192 connected across a stabilized D.C. power supply. Potentiometer 192 is preset to the desired maximum operating value. Output from the current reference appears between point "F" and the arm of the potentiometer 192.

Comparison of the current signal generator output and the current reference occurs in the current comparator 18. This circuit consists of a second diode unit within vacuum tube 181, resistor 182, and capacitor 183. When the current signal generator voltage across resistor 180 exceeds the setting of the current reference, the second diode of tube 181 conducts and an error voltage appears across 182. Capacitor 183 provides integration of the current error signal. The polarity of the error signal appearing across 183 is opposed to the raise bias, and it will reduce the output from the thyratron driver.

Summarizing the current control servo loop, we have the following action: Primary current is sensed across the surge limiting resistor 5. It is converted to a D.C. voltage by the current signal generator 17. When this D.C. voltage exceeds the current reference setting, an error signal is obtained from the current comparator. This signal causes the thyratron driver output to decrease and lower the voltage across the high voltage transformer. This reduces current flow in the primary circuit.

The current signal generator output is approximately ten times that of the spark signal generator. This allows the current servo loop to overpower the spark signal servo loop. Also the current control is adapted to limit short-circuiting currents in the primary circuit. With this control, it is possible to hold rated current in the high voltage rectifier when the rectifier is short-circuited.

The master comparator 12 is the series mixing circuit composed of resistors 182, 132 and 122, which are in the grid circuit of tube 114. In this circuit the current error signals across 182 and the sparking rate error signals across 122 are compared with the raise bias across 132. The resulting voltage summation sets the operating point of the grid driver through the voltage applied to grid of tube 114. Since current does not flow in the grid circuit of tube 114, interaction between the sparking rate control and the current limiting control is prevented.

The speed of response of the control system of the invention can be determined by selection of the parameters of the various circuit elements of the system to provide the desired sensitivity and rate of response so that at all times during the operation of the precipitator the applied voltage is regulated continuously to maintain an optimum selected sparking rate (for example, 100 sparks per minute or the maximum rated current for the rectifier equipment). In the illustrative embodiment of the invention shown in FIGS. 2a and 2b, the magnitude of current transients in the supply line is limited by the ballasting action of the saturable reactor. Fast reactor response to maintain the desired constant sparking rate is obtained by phase control of the thyratron driver 10. The driver circuit illustrated with a 500 volt R.M.S. anode transformer can provide an average D.C. output of approximately 225 volts at 18.6 amperes into the control winding of the reactor and series resistor 104 under full half-wave conduction conditions. Since only 29 volts at 2.4 amperes is needed in typical applications to completely control the reactor, there is a large power reserve in the thyratron driver. Under steady conditions, the thyratron is permitted by the grid control to conduct only over a small portion of the full half-cycle (up to about 40°). When it is necessary to increase or decrease the D.C. control current, the thyratron can be turned on full (180° conduction) or cut off completely within one cycle of the supply frequency.

Close automatic control is also attained by the use of a high gain control system, whereby a very small signal variation gives rise to a large variation in the control circuit output. In the illustrative system of FIGS. 2a and 2b a very small input increase of the order of a milliwatt in the grid circuit of tube 114 can provide a kilowatt of power from the thyratron driver—a control power gain of approximately one million.

It will be clear to those skilled in the art that many variations can be made in the components of the system and the arrangement thereof without departing from the principles of the invention as defined in the claims.

The input signal for the current signal generator can be obtained by means other than series resistor 5 in the primary circuit. A current transformer can be used in place of the resistor, saving the heat loss. The current signal can be also obtained from the rectified D.C. across a resistor in the high voltage rectifier ground return circuit. The rectified D.C. voltage across the resistor 110 in the ground circuit could be applied directly to resistor 178 and condenser 179 in place of the D.C. output from rectifiers 174–177.

The arrangement shown in FIGS. 2a and 2b has the important advantage, however, that it provides complete short-circuit protection for both primary and high voltage circuits.

Instead of using two separate inputs "A—A" and "B—B" for the current and spark signals, a common input can be used. This input may be connected either to resistor 5 or to resistor 110 in the ground return circuit of the high voltage rectifier to sense current and sparking simultaneously. The current and spark signals can be separated by two filter networks; one a low-pass and the other a high-pass. The low-pass filter would direct current signals to the current signal generator, and the high-pass filter would direct spark signals to the spark signal generator.

The spark signals may also be picked up by a tertiary winding on the core of transformer 2.

Vacuum diode 181 in the spark and current comparators can be replaced with high-quality silicon diodes. These would eliminate the dual-diode tube shown. The silicon diodes used should have extremely high back-resistance.

A vacuum triode can be also used in place of diode 181. This would provide an amplified error output signal which would further improve the system by providing closer control action with increased stability.

In the master comparator, instead of using a series comparator input with a single triode, it is possible to use a dual triode in place of tube 114 with separate inputs for the spark error and curent error circuits. Another variation is to use a multi-grid tube in place of 114.

The raise bias 13 can be modified by adding a voltage control servo loop, consisting of a voltage signal generator, voltage reference, and voltage comparator. The input signal would be obtained from a connection across the primary of transformer 2 to the voltage signal generator. Output from this generator would be compared with the voltage reference to obtain the voltage raise signal. This arrangement provides more exact proportional control since the raise bias would vary automatically.

The control system of the invention provides means whereby a complete precipitator installation can be energized and automatically controlled within predetermined limits to provide maximum long-term collection efficiency regardless of the number of rectifier sets employed, without requiring any manual operating controls aside from a switch to turn the system on and off.

We claim:

1. An automatic energization control system for electrical precipitators supplied with high voltage direct current by a high voltage transformer-rectifier set, comprising a saturable reactor in the power supply line to the high voltage transformer, a grid-controlled rectifier tube supplying a direct current to the control winding of said saturable reactor to increase the voltage supplied to the high voltage transformer, means supplying a trigger control pulse to said rectifier tube grid, and means responsive to at least two electrical parameters of the transformer-rectifier set for varying the phase of the trigger pulse supplied to said rectifier tube, said parameters comprising the current, voltage, and rate of sparking in the precipitator.

2. An automatic energization control system for electrical precipitators supplied with high voltage direct current by a high voltage transformer-rectifier set, comprising a saturable reactor having an alternating current winding in circuit with the primary of the high voltage transformer and having a direct current control winding, means supplying a direct current to said control winding to increase the voltage supplied to the high voltage transformer, means responsive to the rate of sparking in the precipitator for reducing said direct current supplied to the control winding when the sparking rate exceeds a predetermined value and means responsive to the current supplied to the high voltage transformer for reducing said direct current supplied to the control winding when the current supplied to the high voltage transformer exceeds a predetermined value.

3. An automatic energization control system for electrical precipitators supplied with high voltage direct current by a high voltage transformer-rectifier set, comprising a saturable reactor having an alternating current winding in circuit with the primary of the high voltage transformer and having a direct current control winding, means supplying a direct current to said control winding to increase the voltage supplied to the high voltage transformer, means for sensing the occurrence of sparking in the precipitator, means actuated by the spark sensing means for generating a signal varying with the rate of sparking, means for reducing said direct current supply in response to the sparking rate signal when said signal exceeds a predetermined value, means for sensing the current supplied to the high voltage transformer, means actuated by the current sensing means for generating a second signal varying with the current supplied to the high voltage transformer, and means for reducing said direct current supply in response to the said second signal when said second signal exceeds a predetermined value.

4. An automatic energization control system for electrical precipitators supplied with high voltage direct current by a high voltage transformer-rectifier set, comprising a saturable reactor having an alternating current winding in circuit with the primary of the high voltage transformer and having a direct current control winding, means supplying a direct current to said control winding to increase the voltage supplied to the high voltage transformer, means for sensing the occurrence of sparking in the precipitator, means actuated by the spark sensing means for generating a signal varying with the rate of sparking continuously integrated over a predetermined period, means for reducing said direct current supply in response to the sparking rate signal when said signal exceeds a predetermined value, means for sensing the current supplied to the high voltage transformer, means actuated by the current sensing means for generating a second signal varying with the current supplied to the high voltage transformer, and means for reducing said direct current supply in response to said second signal when said second signal exceeds a predetermined value.

5. An automatic energization control system for electrical precipitators supplied with high voltage direct current by a high voltage transformer-rectifier set, comprising a saturable reactor having an alternating current winding in circuit with the primary of the high voltage transformer and having a direct current control winding, means supplying a direct current to said control winding to increase the voltage supplied to the high voltage transformer, means for sensing the occurrence of sparking in the precipitator, means actuated by the spark sensing means for generating a signal voltage varying with the rate of sparking, means for reducing said direct current supply in response to the excess of said signal voltage over a predetermined reference voltage, means for sensing the current supplied to the high voltage transformer, means actuated by the current sensing means for generating a second signal voltage varying with the current supplied to the high voltage transformer, and means for reducing said direct current supply in response to the excess of said second signal voltage over a predetermined reference voltage.

6. An automatic energization control system for electrical precipitators supplied with high voltage direct current by a high voltage transformer-rectifier set, comprising a saturable reactor having an alternating current winding in circuit with the primary of the high voltage transformer and having a direct current control winding, means supplying a direct current to said control winding to increase the voltage supplied to the high voltage transformer, means for sensing the occurrence of sparking in the precipitator, means actuated by the spark sensing means for generating a signal voltage proportional to the rate of sparking, means for reducing said direct current supply in response to the excess of said signal voltage over a predetermined reference voltage, means for sensing the current supplied to the high voltage transformer, means actuated by the current sensing means for generating a second signal voltage proportional to the current supplied to the high voltage transformer, and means for reducing said direct current supply in response to the excess of said second signal voltage over a predetermined reference voltage.

7. An automatic energization control system for electrical precipitators supplied with high voltage direct current by a high voltage transformer-rectifier set, comprising a saturable reactor having an alternating current winding in circuit with the primary of the high voltage transformer and having a direct current control winding, means supplying a direct current to said control winding to increase the voltage supplied to the high voltage transformer, means for sensing the occurrence of sparking in the precipitator, means actuated by the spark sensing means for generating a first signal voltage proportional to the rate of sparking, means for sensing the current supplied to the high voltage transformer, means actuated by the current sensing means for generating a second signal voltage proportional to the current supplied to the high voltage transformer, means for generating first and second error voltages proportional to the excesses of said first and second signal voltages over predetermined reference voltages, and means for reducing said direct current supply in response to the stronger of said error voltages.

8. An automatic energization control system for electrical precipitators supplied with high voltage direct current by a high voltage transformer-rectifier set, comprising a saturable reactor having an alternating current winding in circuit with the primary of the transformer and having a direct current control winding, a grid-controlled rectifier tube supplying a direct current to said control winding to increase the voltage supplied to the high voltage transformer, means for generating a first signal voltage proportional to the rate of sparking in the precipitator, means for generating a second signal voltage proportional to the current supplied to the high voltage transformer, means for generating first and second error voltages proportional to the excesses of said first and second signal voltages over predetermined reference voltages, and means responsive to the stronger of said error voltages for varying the phase of the trigger pulse supplied to said rectifier tube to reduce said direct current supply.

9. An automatic energization control system for electrical precipitators supplied with high voltage direct current by a high voltage transformer-rectifier set, comprising a saturable reactor in the power supply line to the high voltage transformer, means supplying a direct current to the control winding of said saturable reactor to increase the voltage supplied to the high voltage transformer, and means responsive to a plurality of electrical parameters of the transformer-rectifier set including means responsive to the rate of sparking in the precipitator for reducing said direct current supplied to the control winding of the saturable reactor when any of said electrical parameters exceeds a predetermined value.

10. An automatic energization control system for electrical precipitators supplied with high voltage direct current by a high voltage transformer-rectifier set, comprising a saturable reactor having an alternating current winding in circuit with the primary of the high voltage transformer and having a direct current control winding, means supplying a direct current to said control winding to increase the voltage supplied to the high voltage transformer, means responsive to the rate of sparking in the precipitator for reducing said direct current supplied to the control winding when the sparking rate exceeds a predetermined value, and means responsive to variations in current flow in the precipitator energizing system for reducing said direct current supplied to the control winding when the current flow in the energizing system exceeds a predetermined value.

11. A precipitator for removing foreign particles from a gas comprising a discharge electrode for charging said particles, a collecting electrode for receiving said charged particles, means for supplying voltage and a substantially constant level current flow to said discharge electrode, means for sensing said current flow during corona discharge and sparking at said electrode, and for developing a signal corresponding to said sensed current flow, means for developing a reference signal corresponding to said constant level current flow during corona discharge, means responsive to said sensing means when said current flow during corona discharge exceeds said reference signal for maintaining said current flow at said constant level, and means responsive to said sensing means being operative solely upon sparking resulting in transient current surges for lowering said voltage to a value at which spark-over is diminished.

12. A precipitator for removing foreign particles from a gas comprising a discharge electrode for charging said particles, a collecting electrode for receiving said charged particles, means for supplying voltage and a substantially constant level current flow to said discharge electrode, means for sensing said current flow during corona discharge and sparking at said electrode, means responsive to said sensing means when said current flow during corona discharge exceeds said constant level current flow for maintaining said current flow at said constant level, and means responsive to said sensing means being operative solely upon sparking resulting in transient current surges for reducing said voltage to a value at which spark-over is diminished and including means for adjusting the magnitude and duration of said voltage reduction.

13. In an electrostatic precipitator a power supply system comprising means for supplying a voltage and a substantially constant level current flow to said precipitator, means for sensing the flow of current to said precipitator, means for controlling the flow of current and voltage to the precipitator including saturable reactor means, means connected between said sensing means and said saturable reactor means responsive to normal current flow exceeding said constant level current flow to vary the impedance of the saturable reactor means so as to reduce the current flow to said precipitator to the constant level flow, and means connected between said sensing means responsive to transient surges of current resulting from sparking including means for rendering said responsive means inoperative during normal current flow and operative upon transient surges for varying the impedance of said saturable reactor means to instantaneously lower said voltage.

14. An electrical precipitator system comprising a transformer supplied from an alternating current supply source providing a preset substantially constant level of current flow, rectifying means for the output of said transformer, a discharge electrode connected to said rectifying means, an electrical energy control system for controlling the flow of current and voltage to the discharge electrode comprising means for sensing the flow of current to said precipitator, saturable reactor means connected between said source and said transformer, a voltage control circuit connected to said sensing means and said saturable reactor means including means being inoperative during normal current flow and being operative only upon the occurrence of transient current surges resulting from spark-over for developing a pulse signal, a voltage regulating circuit including means for selectively adjusting the magnitude and the rate of the pulse so as to vary the impedance of said saturable reactor means and reduce said voltage to said discharge electrode in accordance with a selected spark rate.

15. The invention as defined in claim 14 in which said pulse magnitude and discharge rate means comprise a variable resistor and a condenser.

16. An electrical precipitator system comprising a transformer supplied from an alternating current supply source providing a preset constant level of current flow, rectifying means for the output of said transformer, a discharge electrode connected to said rectifying means, an electrical energy control system for controlling the flow of current and voltage to the discharge electrode comprising means for sensing the flow of current to said precipitator, saturable reactor means connected between said source and said transformer, a current control circuit connected to said sensing means and said saturable reactor including means for developing a signal corresponding to the actual current flow to said discharge electrode, means for developing a reference signal corresponding to the preset constant level current flow, means for generating a signal corresponding to the difference between said actual and preset constant level solely when said actual current flow exceeds said preset level of current flow so as to vary the impedance of said saturable reactor means and reduce said current flow to said discharge electrodes to said preset value, a voltage control circuit connected to said sensing means and said saturable reactor means including means being inoperative during normal current flow and being operative only upon the occurrence of transient current surges resulting from spark-over for developing a pulse signal, a voltage regulating circuit including means for selectively adjusting the magnitude and the rate of the pulse so as to vary the impedance of said saturable reactor means and reduce said voltage to said discharge electrode in accordance with a predetermined spark rate.

17. The invention as defined in claim 16 in which said saturable reactor means comprises a first saturable reactor having a control winding and a controlled winding, and a second saturable reactor having controlled winding means connected to said control winding and control windings arranged to be responsive to said error signal and said pulse signals to increase the impedance in said first saturable reactor control windings.

18. The invention as defined in claim 17 in which said pulse magnitude and rate means comprises a variable resistor and a condenser.

19. An electrical precipitator system comprising a transformer supplied from an alternating current supply source, rectifying means for the output of said transformer, a discharge electrode connected to said rectifying means, an electrical energy control system for controlling the flow of current and voltage to the discharge electrode comprising means for sensing the flow of current to said precipitator, saturable reactor means connected between said source and said transformer, a voltage control circuit connected to said sensing means and said saturable reactor means including means being inoperative during normal current flow and being operative only upon the occurrence of transient current surges resulting from spark-over for developing a pulse signal, a voltage regulating circuit including means for selectively adjusting the magnitude and the rate of the pulse so as to vary the impedance of said saturable reactor means and reduce said voltage to said discharge electrode in accordance with a selected spark rate.

20. An electrical precipitator system comprising a transformer supplied from an alternating current supply source, rectifying means for the output of said transformer, a discharge electrode connected to said rectifying means, an electrical energy control system for controlling the flow of current and voltage to the discharge electrode comprising means for sensing the flow of current to said precipitator, saturable reactor means connected between said source and said transformer, a current control circuit connected to said sensing means and said saturable reactor including means for developing a signal corresponding to the actual current flow to said discharge electrode, means for developing a reference signal corresponding to a preselected constant level current flow, means for generating a signal corresponding to the difference between said actual and preselected constant level solely when said actual current flow exceeds said preselected level of current flow so as to vary the impedance of said saturable reactor means and reduce said current flow to said discharge electrodes to said preselected value, a voltage control circuit connected to said sensing means and said saturable reactor means including means being inoperative during normal current flow and being operative only upon the occurrence of transient current surges resulting from spark-over for developing a pulse signal, a voltage regulating circuit including means for selectively adjusting the magnitude and the rate of the pulse so as to vary the impedance of said saturable reactor means and reduce said voltage to said discharge electrode in accordance with a predetermined spark rate.

References Cited in the file of this patent

UNITED STATES PATENTS

| | | |
|---|---|---|
| 2,511,219 | Pogorzelski | June 13, 1950 |
| 2,675,092 | Hall | Apr. 13, 1954 |
| 2,714,188 | Scherer | July 26, 1955 |
| 2,742,104 | Hall | Apr. 17, 1956 |
| 2,764,254 | Klemperer | Sept. 25, 1956 |
| 2,771,150 | Welts | Nov. 20, 1956 |
| 2,800,191 | Hall | July 23, 1957 |
| 2,897,914 | Camp et al. | Aug. 4, 1959 |
| 2,961,577 | Thomas et al. | Nov. 22, 1960 |

Disclaimer 3,147,094.—*Herbert J. Hall*, Princeton, *Harold E. Van Hoesen*, Somerville, and *Harry J. White*, Basking Ridge, N.J. CONTROL SYSTEM FOR ELECTRICAL PRECIPITATORS. Patent dated Sept. 1, 1964. Disclaimer filed Dec. 8, 1969, by the assignee, *Research-Cottrell, Inc.*

Hereby enters this disclaimer to claims 11, 12 and 13 of said patent.

[*Official Gazette March 31, 1970.*]